United States Patent
Spisak

(10) Patent No.: US 10,275,054 B2
(45) Date of Patent: *Apr. 30, 2019

(54) PROCESSING A WEB PAGE

(75) Inventor: Michael J. Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 1153 days.

This patent is subject to a terminal disclaimer.

(21) Appl. No.: 13/534,054

(22) Filed: Jun. 27, 2012

(65) Prior Publication Data
US 2012/0272138 A1 Oct. 25, 2012

Related U.S. Application Data

(60) Continuation of application No. 11/557,191, filed on Nov. 7, 2006, now Pat. No. 8,250,485, which is a division of application No. 10/166,839, filed on Jun. 11, 2002, now Pat. No. 7,188,318.

(51) Int. Cl.
| G06F 17/00 | (2006.01) |
| G06F 3/038 | (2013.01) |
| G06F 3/023 | (2006.01) |

(52) U.S. Cl.
CPC ............ *G06F 3/038* (2013.01); *G06F 3/0235* (2013.01)

(58) Field of Classification Search
CPC ....................................................... G06F 17/00
USPC ................................ 715/827, 760, 762, 825
See application file for complete search history.

(56) References Cited

U.S. PATENT DOCUMENTS

| 5,796,404 | A | 8/1998 | Gentner |
| 6,029,135 | A | 2/2000 | Krasle |
| 6,085,120 | A | 7/2000 | Schwerdtfeger et al. |
| 6,122,391 | A | 9/2000 | Ringland et al. |
| 6,289,304 | B1 | 9/2001 | Greferstette |
| 6,724,399 | B1 | 4/2004 | Katchour et al. |
| 7,188,318 | B2 | 3/2007 | Spisak |
| 2002/0032701 | A1 | 3/2002 | Gao et al. |
| 2002/0036620 | A1 | 3/2002 | Tervo |
| 2002/0036660 | A1 | 3/2002 | Adan et al. |
| 2002/0070962 | A1 | 6/2002 | Van Doorselaer et al. |
| 2002/0156870 | A1 | 10/2002 | Boroumand et al. |
| 2003/0234822 | A1 | 12/2003 | Spisak |
| 2004/0104944 | A1 | 6/2004 | Koay et al. |

(Continued)

OTHER PUBLICATIONS

Office Action (dated Jul. 29, 2005) for U.S. Appl. No. 10/166,839, filed Jun. 11, 2002.

(Continued)

*Primary Examiner* — Tadesse Hailu
*Assistant Examiner* — Darrin Hope
(74) *Attorney, Agent, or Firm* — Schmeiser, Olsen & Watts, LLP; Mark Vallone

(57) ABSTRACT

A method and computer system for processing a web page. A first web page is parsed. The first web page includes at least one Universal Resource Locator (URL). During the parsing, as each URL of the at least one URL on the first web page is encountered, the first web page is transformed by appending to a link statement of each URL on the first web page an associated two-key code that associates the two-key code with each URL on the first web page. The first web page is displayed on a display screen of the computer system. The display of the web page is initiated after the parsing has been performed.

16 Claims, 4 Drawing Sheets

(56) References Cited

U.S. PATENT DOCUMENTS

2004/0205502 A1\* 10/2004 Baird .................... 715/501.1
2007/0067741 A1 3/2007 Spisak

OTHER PUBLICATIONS

Amendment filed Oct. 31, 2005 in response to Office Action (dated Jul. 29, 2005) for U.S. Appl. No. 10/166,389, filed Jun. 11, 2002.
Final Office Action (dated Jan. 10, 2006) for U.S. Appl. No. 10/166,839, filed Jun. 11, 2002.
Amendment after Final filed Jan. 19, 2006 in response to Final Office Action (dated Jan. 10, 2006) for U.S. Appl. No. 10/166,839, filed Jun. 11, 2002.
Final Office Action (dated Feb. 14, 2006) for U.S. Appl. No. 10/166,839, filed Jun. 11, 2002.
Amendment after Final filed Feb. 28, 2006 in response to Final Office Action (dated Feb. 14, 2006) for U.S. Appl. No. 10/166,839, filed Jun. 11, 2002.
Advisory Action (dated Mar. 15, 2006) for U.S. Appl. No. 10/166,839, filed Jun. 11, 2002.
Notice of Appeal filed Jun. 14, 2006 for U.S. Appl. No. 10/166,839, filed Jun. 11, 2002.
Appeal Brief filed Aug. 14, 2006 for U.S. Appl. No. 10/166,839, filed Jun. 11, 2002.
Notice of Allowance (dated Oct. 30, 2006) for U.S. Appl. No. 10/166,839, filed Jun. 11, 2002.
Office Action (dated May 12, 2009) for U.S. Appl. No. 11/557,191, filed Nov. 7, 2006.
Amendment filed Aug. 10, 2009 in response to Office Action (dated May 12, 2009) for U.S. Appl. No. 11/557,191, filed Nov. 7, 2006.
Final Office Action (dated Dec. 10, 2009) for U.S. Appl. No. 11/557,191, filed Nov. 7, 2006.
Amendment after Final filed Mar. 9, 2010 in response to Final Office Action (dated Dec. 10, 2009) for U.S. Appl. No. 11/557,191, filed Nov. 7, 2006.
Advisory Action (dated Mar. 9, 2010) for U.S. Appl. No. 11/557,191, filed Nov. 7, 2006.
Request for Continued Examination and Amendment filed Apr. 5, 2010 in response to Advisory Action (dated Mar. 9, 2010) for U.S. Appl. No. 11/557,191, filed Nov. 7, 2006.
Notice of Allowance (dated Apr. 12, 2012) for U.S. Appl. No. 11/557,191, filed Nov. 7, 2006.

\* cited by examiner

PROCESSING A WEB PAGE

This application is a continuation application claiming priority to Ser. No. 11/557,191, filed Nov. 7, 2006, now U.S. Pat. No. 8,250,485, issued Aug. 21, 2012; which is a divisional of Ser. No. 10/166,839, filed Jun. 11, 2002, U.S. Pat. No. 7,188,318, issued Mar. 6, 2007.

TECHNICAL FIELD

The field of the invention is that of computer programs for assisting disabled persons to use the Internet, in particular the World Wide Web.

BACKGROUND OF THE INVENTION

Recommendations for standard methods for accessing the Internet have been made by various bodies such as World Wide Web Consortium (W3C), W3C—Web Accessibility Initiative (WAI), IBM Corporation Microsoft Corporation, National Institute for Disability and Rehabilitation Research and Verizon Foundation, including methods appropriate for use by persons with various handicaps.

In particular, advocates for the disabled recommend that standard client/server applications should be accessible/_navigatable_ by multiple methods. Moreover, this would be beneficial to diverse companies who wish to expand their existing user/customer base to allow end-users to navigate using either a mouse or the keyboard.

Not all web sites are aware of such standards, let alone being compliant with them and there are many web sites that people who cannot use a mouse cannot access.

It would be advantageous if a program were available to modify non-compliant web sites so that they may be accessed using only the keyboard.

SUMMARY OF THE INVENTION

The invention relates to a computer program that modifies a web page and converts the URL links to a handicap-accessible format.

A feature of the invention is the filtering of a web page and conversion of all URL links into navigation elements that may be navigated via either a mouse or a keyboard.

Another feature of the invention is the addition of "ALT" parameters to images that are links to web sites so that alternative text information for graphical images referenced by the "IMG" tag helps the visitor understand what is on the page even if they are using a text browser or if they have image loading turned off in their graphical browser.

DETAILED DESCRIPTION

In the course of viewing sites on the Internet, users routinely place the mouse cursor on an icon, photograph or other location on the computer display and click the mouse button. Although word processing programs permit the user to use "shortcuts" employing keys on the keyboard, Internet browsers do not have this capability.

Keyboard navigation capability is provided by a program, resident in memory, that can be invoked to process the screen image presented by an Internet site and to generate key combinations that will cause the computer to perform the same functions as mouse clicks.

Those skilled in the art are aware that a web site passes (through the browser) to the user's computer a collection of parameters that specify the image displayed on the screen. Among the items displayed are icons that invoke other pages in that web site or other web sites. When the user clicks his mouse (the phrase "mouse click" also refers to equivalent switch data such as input from a trackball or from a joystick on a laptop) on the icon, the browser fetches data from the URL associated with the icon. The URL itself, being a string of numbers, is not displayed to the user. The icon may be text—(e.g. www.somesite.com) or a graphic symbol. For convenience in expressing the claims, the term "URL" will be taken to mean any representation of the data used by the Web, including text and graphics. When the web page is displayed on the computer screen, a representation of the screen is stored in computer memory. The representation may be in an expanded form specifying the color for each pixel or it may be in the condensed form of the HTML (or other language). When the system has moved on to another screen, previously displayed screens are often cached, so that they may be called up quickly. The cache may be in RAM or in slower storage, such as a disk.

Figure 3:
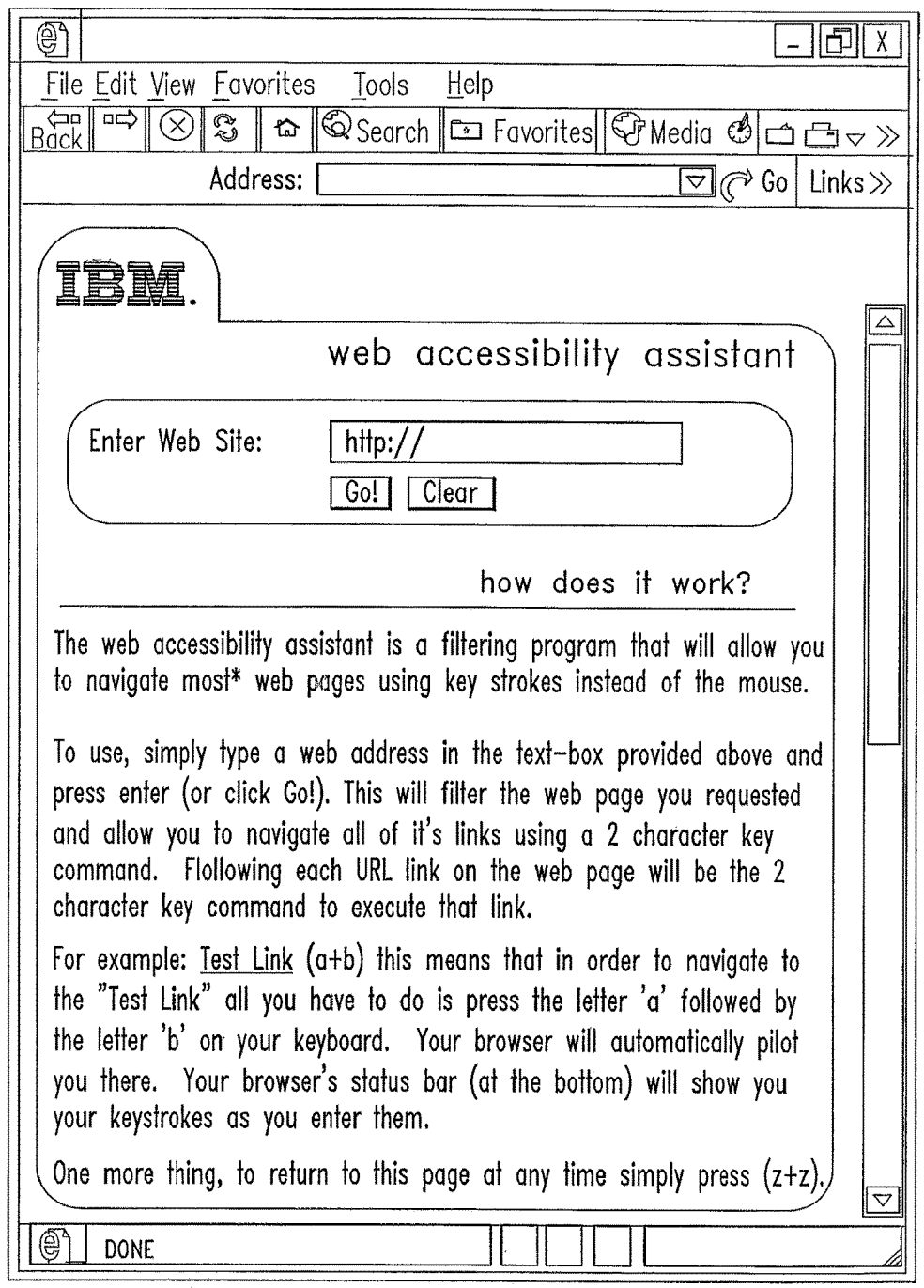
FIG. 3 illustrates an introductory screen displayed by a program according to the invention.
Figure 4:
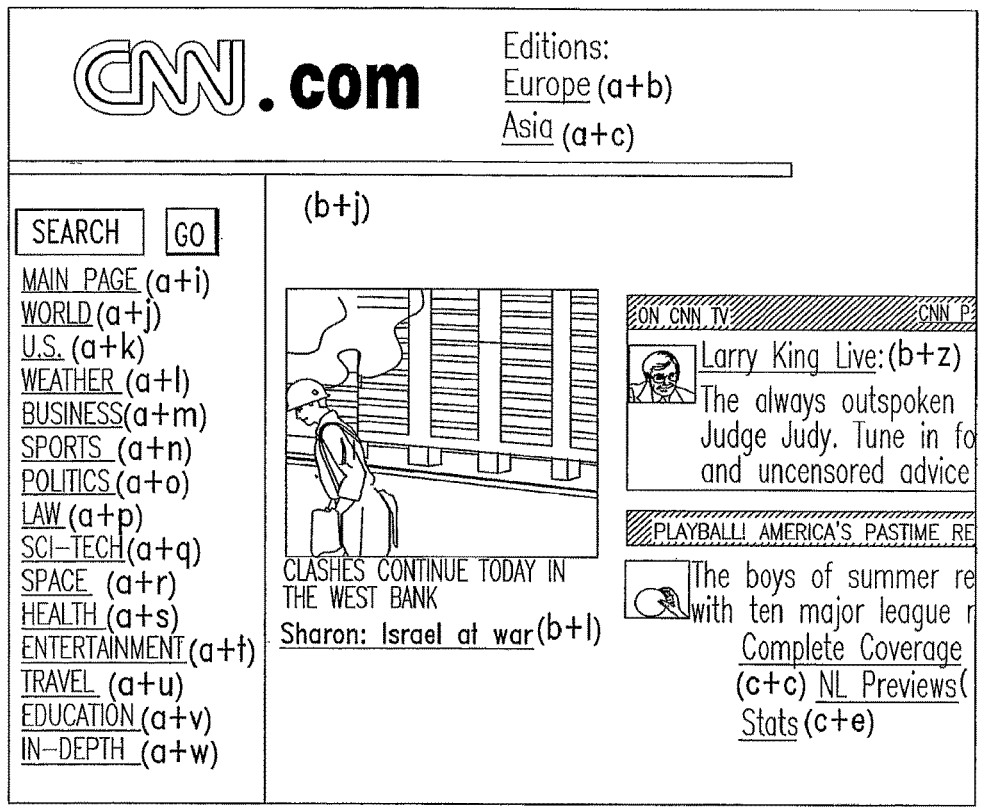
FIG. 4 illustrates a Web page modified by a program according to the invention.

A program according to the invention may operate in at least the following modes:

1. A web-based GUI interface (basically a web page), that the user would invoke (e.g. FIG. 3). Once at the web page, the user is provided with a text-box to type a URL (Universal Resource Locator) into. The URL that is typed into the text-box on the web page is fetched and "transcoded" on the fly by the inventive program to enable triggering URL's by keystroke. Each subsequent page fetched from then on is transcoded to enable keystrokes. The display of the data is performed by the browser.

Figure 2:
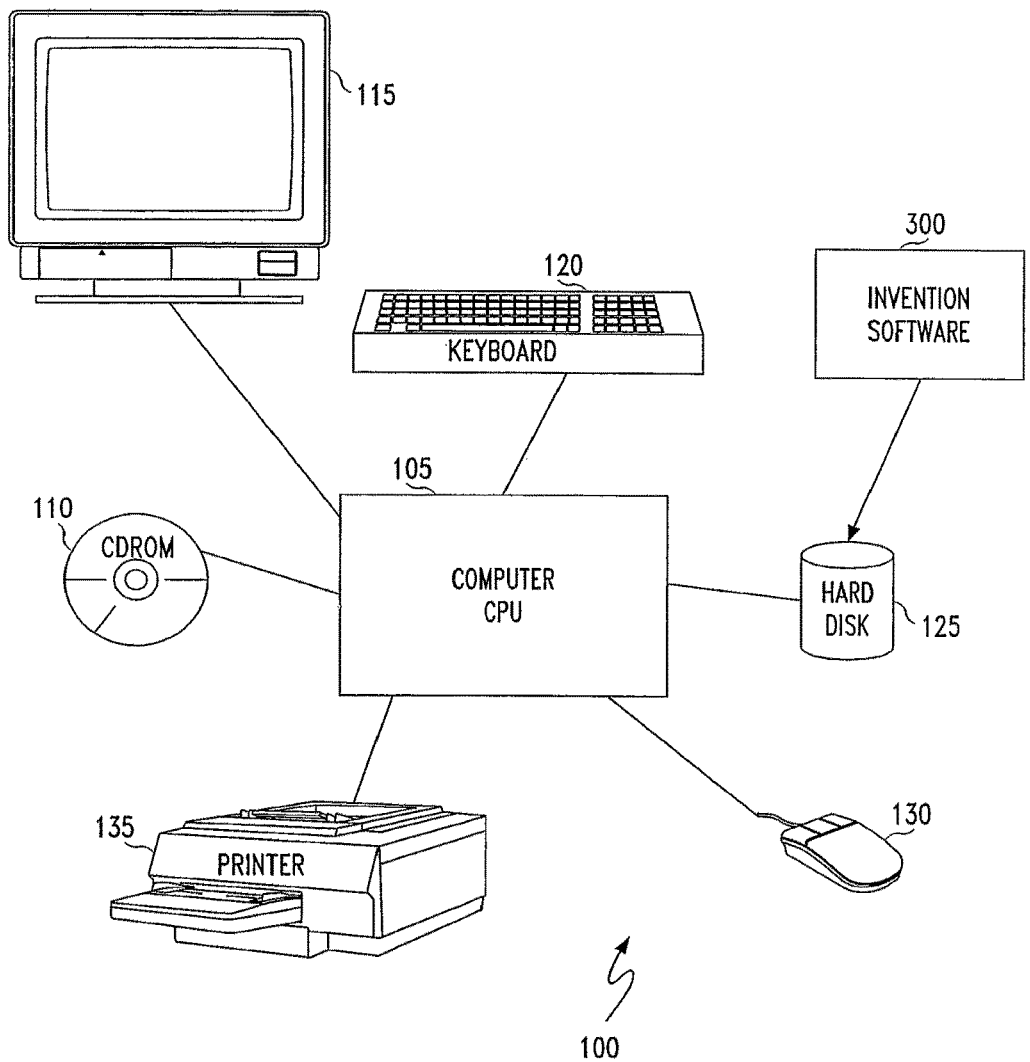
FIG. 2 represents schematically a computer system for use with the invention.

2. A plug-in to the browser client application; i.e. the application could run locally to the web browser. Once activated, the program would enable the displayed web page to have the appropriate keystroke mechanism for each URL displayed. Each subsequent page fetched from then on is transcoded to enable keystrokes (FIG. 2).

3. A Proxy Server implementation that intercepts the data stream coming from the Internet to the browser and transcodes (analogous to translating) the data on the fly.

4. A developer interface implementation that would enable the author of a web page to include special symbols in the actual HTML code (e.g.: @HOTKEY=_A_). When a web browser requests the web page, a processor on the web server scans the requested web page and finds the special symbols in the HTML code (e.g.: @HOTKEY=_A_) and converts these to the appropriate keystroke mechanism for each URL displayed. Every web page called that contains the special symbol in the HTML code would be enabled for _transcoding_.

Figure 1:
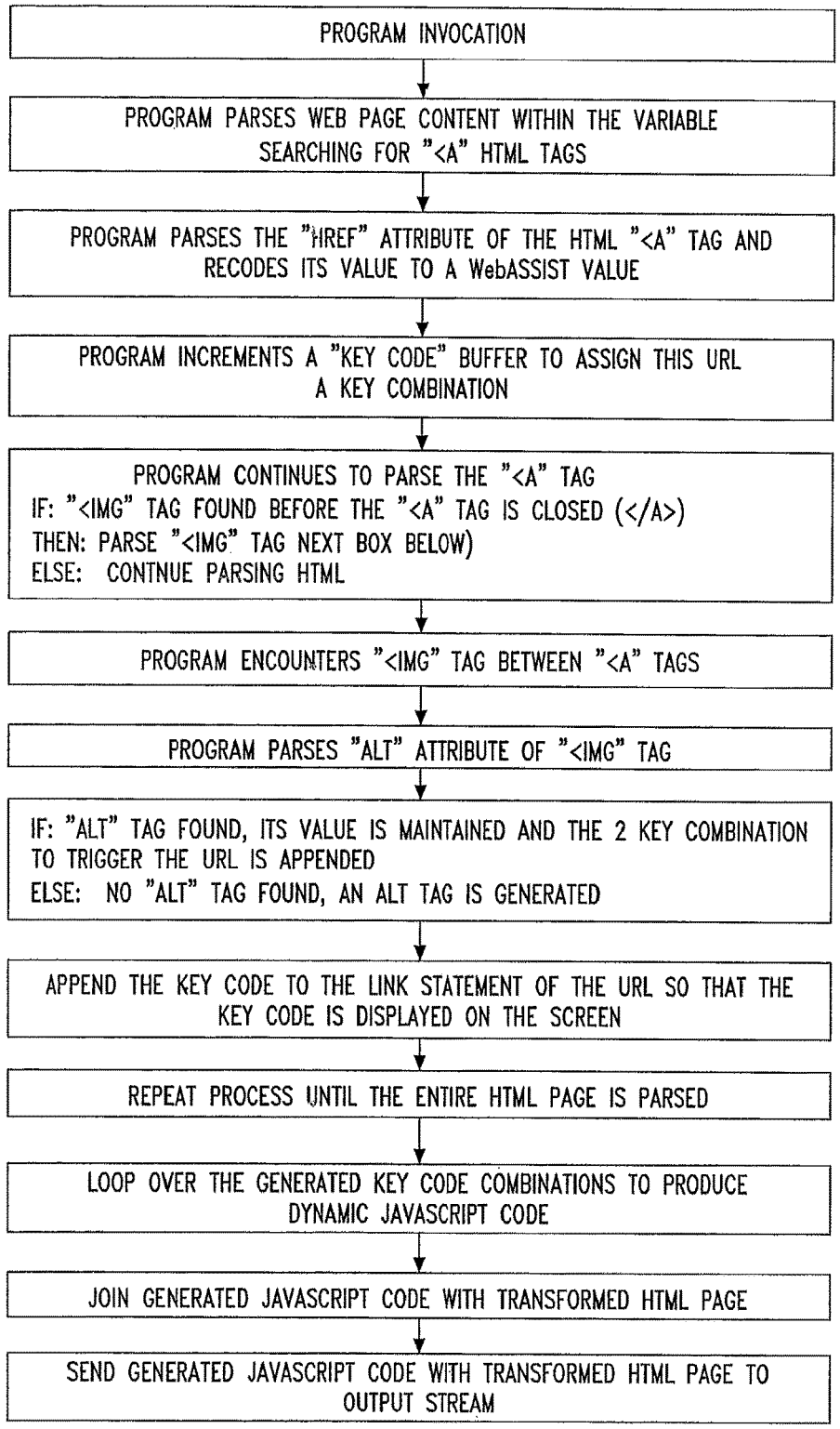
FIG. 1 illustrates a flow chart for a program according to the invention.

In operation, the program parses the data for a web page. A detailed description of the steps involved is shown in TABLE 1, with a simplified version in FIG. 1. When the program encounters a URL, it generates computer code (preferably in the JavaScript language) that inserts a two-key code in the screen display near the icon that represents the URL. When the screen is displayed and the computer is waiting for a response, the program scans the keyboard data stream for any of the codes that it has displayed. It intercepts a code from the user and passes the appropriate mouse clicks to the browser (along with the data that is ordinarily sent to the browser, e.g. the actual URL associated with the icon).

TABLE 1

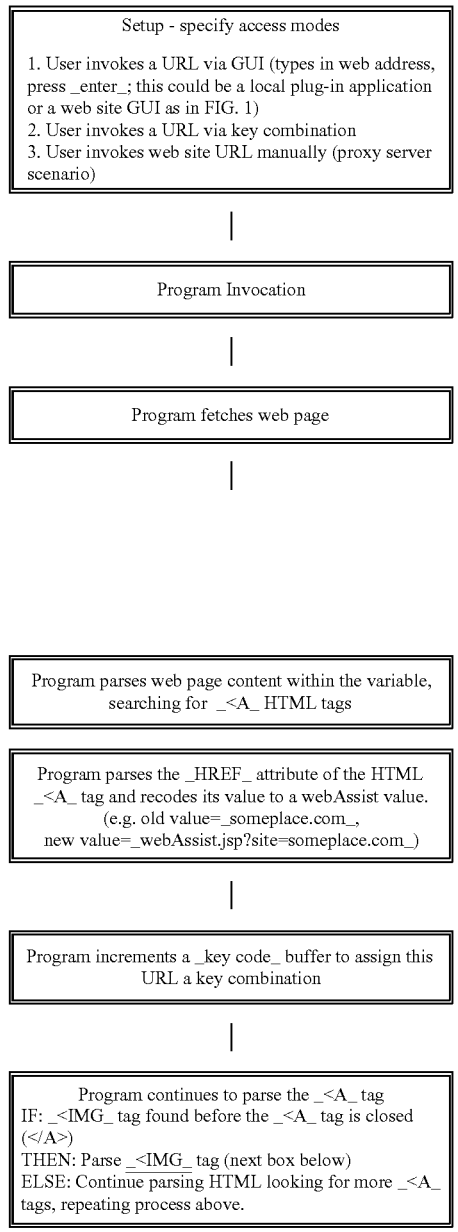

TABLE 1-continued

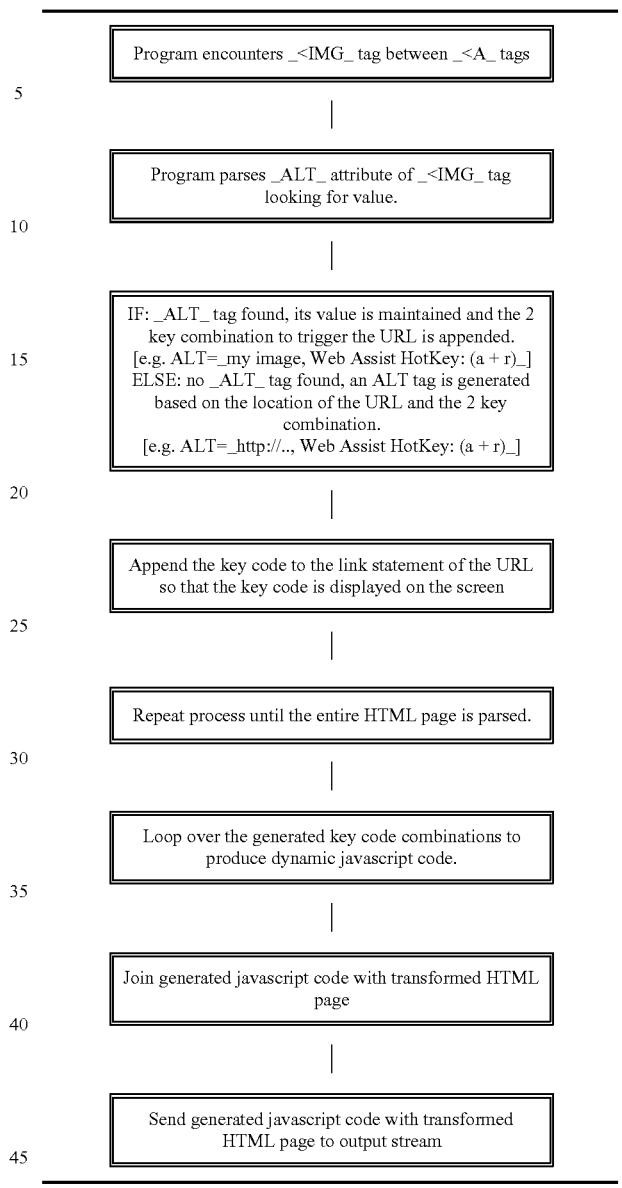

The browser fetches the information that the user has specified with the key code, e.g. another web page, and the program parses that in the same way. The procedure continues through the Internet session, so that, once the program has been invoked, the user sees keycodes on each screen containing a URL without further action on his part.

The JavaScript code is placed in the header of the HTML document, so that it is stored along with the other document data when the page is cached in computer memory. Thus, when the user performs an act equivalent to clicking on the "back" arrow on the screen (e.g. typing the 2-key code for the back arrow) the stored page is fetched from memory with the key codes already placed in the data.

Those skilled in the art are familiar with the standard format that presents a URL to the user, such as—"www.somesite.com" and also with the convention that the mouse pointer arrow changes to a hand with a pointing finger when the mouse cursor passes over a photograph or other icon that does not show text. Optionally, the parsing action of the program includes testing images for links to URLs. If a link is found, the program converts an ALT parameter associated with the image to generate a key code in the same way as with other links. If an ALT parameter is not found, the program adds one, together with the keycode.

The keycodes are preferably chosen so that they contain a symbol such as # that does not occur in ordinary text and so will not cause confusion with text that the user may type in the course of using the web page (such as a search request). Optionally, the user may type the key-combination that "wakes" the listener the keyboard assistant then traps keystrokes and tries to associate it with a URL link on the displayed page. The keyboard assistance turns itself off when one of the following conditions are met: 1—after a link is successfully triggered, 2—after the key combination toggles the listener off.

The keycodes can be anything a programmer wants (illustratively beginning with a symbol such as _#_ or the key combination) or any character combination. A programmer using the invention may choose to display the keycode next to each link on the page or in a separate box that lists keycodes together with the URLs that they substitute for, depending on a design choice. As another design choice, the programmer may choose to include code to enable the user to navigate through the screen display using the keyboard: (screen top, screen bottom, tab to go to the next URL, etc.).

Referring now to FIG. 2, there is shown in schematic form a typical computer system, in which CPU 105 performs the processing, CRT 115 is the screen display, mouse 130 provides the mouse clicks that are substituted for, keyboard 120 is used for the keystroke combinations, CDROM 110 may be used for transferring programs, disk 125 and software box 300 store the programs and data and printer 135 and standard output and input functions.

While the invention has been described in terms of a single preferred embodiment, those skilled in the art will recognize that the invention can be practiced in various versions within the spirit and scope of the following claims.

What is claimed is:

1. A method for processing a web page, said method comprising:
    fetching, by a processor of a computer system, a first web page, said first web page comprising at least one Universal Resource Locator (URL);
    said processor parsing the first web page;
    during said parsing, as each URL of the at least one URL on the first page is encountered, said processor transforming the first web page by appending to a link statement of said each URL on the first web page an associated two-key code that associates the two-key code with said each URL on the first web page;
    after said parsing has parsed the entire first web page, said processor looping over the appended two-key codes on the first web page, said looping comprising generating computer code that associates said each URL on the first web page with its associated two-key code;
    after said looping, said processor forming a joined first web page by joining the generated computer code with the transformed first web page;
    said processor sending the joined first web page to an output stream that is directed to the display screen which results in the joined first web page arriving at the display screen;
    in response to said joined first web page arriving at the display screen, said processor displaying the first web page on a display screen of the computer system, said displaying comprising depicting on the displayed first web page: each two-key code and an indication of which URL on the first web page each two-key code is associated with, wherein said displaying is initiated after said parsing has been performed.

2. The method of claim 1, wherein said depicting comprises depicting each two-key code near an icon that represents the URL that each two-key code is associated with.

3. The method of claim 1, wherein said depicting comprises depicting on the first web page a box that lists each two-key code and the URL that each two-key code is associated with.

4. The method of claim 1, wherein the generated computer code is in a JavaScript language.

5. The method of claim 1, said method further comprising:
    after said displaying the first web page, said processor scanning a keyboard data stream for detection of a first two-key code of the displayed two-key codes on the first web page, the URL on the first web page associated with the first two-key code having a link to a second web page, said keyboard data stream having been generating from use of the keyboard by a user of the computer system following said displaying.

6. The method of claim 1, wherein said parsing comprises testing images on the first web page for links to URLs.

7. The method of claim 1, wherein the computer system comprises a keyboard and a program that accepts mouse clicks by substituting keyboard entries for mouse clicks, said method further comprising:
    said processor associating a keystroke combination with a first URL;
    responsive to a keystroke, said processor passing a mouse click and other data to the program, said other data comprising the first URL;
    said processor processing a first data stream containing a plurality of URLs;
    said processor transcoding URLs in the first data stream to associate keystroke combinations with the URLs in the first data stream; and
    said processor displaying, on the display screen, a screen display based on the first data stream and including the keystroke combinations together with representations of the URLs in the first data stream.

8. The method of claim 7, said method further comprising:
    said processor responding to a computer program in the computer system as a proxy server and processing requests from the computer program for data from data processing systems external to said computer system.

9. A computer system comprising a processor and a computer readable memory, said memory containing program code configured to be executed by the processor to implement a method for processing a web page, said method comprising:
    said processor fetching a first web page, said first web page comprising at least one Universal Resource Locator (URL);
    said processor parsing the first web page;
    during said parsing, as each URL of the at least one URL on the first web page is encountered, said processor transforming the first web page by appending to a link statement of said each URL on the first web page an associated two-key code that associates the two-key code with said each URL on the first web page;
    after said parsing has parsed the entire first web page, said processor looping over the appended two-key codes on the first web page, said looping comprising generating computer code that associates said each URL on the first web page with its associated two-key code;

after said looping, said processor forming a joined first web page by joining the generated computer code with the transformed first web page;

said processor sending the joined first web page to an output stream that is directed to the display screen which results in the joined first web page arriving at the display screen;

in response to said joined first web page arriving at the display screen, said processor displaying the first web page on a display screen of the computer system, said displaying comprising depicting on the displayed first web page: each two-key code and an indication of which URL on the first web page each two-key code is associated with, wherein said displaying is initiated after said parsing has been performed.

10. The computer system of claim 9, wherein said depicting comprises depicting each two-key code near an icon that represents the URL that each two-key code is associated with.

11. The computer system of claim 9, wherein said depicting comprises depicting on the first web page a box that lists each two-key code and the URL that each two-key code is associated with.

12. The computer system of claim 9, wherein the generated computer code is in a JavaScript language.

13. The computer system of claim 9, said method further comprising:

after said displaying the first web page, said processor scanning a keyboard data stream for detection of a first two-key code of the displayed two-key codes on the first web page, the URL on the first web page associated with the first two-key code having a link to a second web page, said keyboard data stream having been generating from use of the keyboard by a user of the computer system following said displaying.

14. The computer system of claim 9, wherein said parsing comprises testing images on the first web page for links to URLs.

15. The computer system of claim 9, wherein the computer system comprises a keyboard and a program that accepts mouse clicks by substituting keyboard entries for mouse clicks, said method further comprising:

said processor associating a keystroke combination with a first URL;

responsive to a keystroke, said processor passing a mouse click and other data to the program, said other data comprising the first URL;

said processor processing a first data stream containing a plurality of URLs;

said processor transcoding URLs in the first data stream to associate keystroke combinations with the URLs in the first data stream; and said processor displaying, on the display screen, a screen display based on the first data stream and including the keystroke combinations together with representations of the URLs in the first data stream.

16. The computer system of claim 15, said method further comprising:

said processor responding to a computer program in the computer system as a proxy server and processing requests from the computer program for data from data processing systems external to said computer system.

\* \* \* \* \*